United States Patent
Ni et al.

(10) Patent No.: US 12,222,843 B2
(45) Date of Patent: Feb. 11, 2025

(54) AI BUG-FIX POSITIONING BY LSTM

(71) Applicant: Dell Products L.P., Round Rock, TX (US)

(72) Inventors: Jiacheng Ni, Shanghai (CN); Spenser Sheng, Shanghai (CN); Kay Shan, Shanghai (CN); Stefanie Menghuan Chen, Shanghai (CN)

(73) Assignee: Dell Products, L.P., Round Rock, TX (US)

( * ) Notice: Subject to any disclaimer, the term of this patent is extended or adjusted under 35 U.S.C. 154(b) by 109 days.

(21) Appl. No.: 18/095,035

(22) Filed: Jan. 10, 2023

(65) Prior Publication Data

US 2023/0222049 A1    Jul. 13, 2023

(30) Foreign Application Priority Data

Jan. 13, 2022  (CN) .......................... 202210039340.X

(51) Int. Cl.
| | |
|---|---|
| *G06F 9/44* | (2018.01) |
| *G06F 11/36* | (2006.01) |
| *G06F 17/18* | (2006.01) |
| *G06N 3/0442* | (2023.01) |

(52) U.S. Cl.
CPC ...... *G06F 11/3664* (2013.01); *G06F 11/3688* (2013.01); *G06N 3/0442* (2023.01)

(58) Field of Classification Search
CPC ............ G06F 11/3664; G06F 11/3688; G06N 3/0442
See application file for complete search history.

(56) References Cited

U.S. PATENT DOCUMENTS

| | | | |
|---|---|---|---|
| 10,073,763 B1* | 9/2018 | Raman | G06F 11/3688 |
| 2014/0109055 A1* | 4/2014 | Gibbens | G06F 11/3664 |
| | | | 717/125 |
| 2017/0235569 A1* | 8/2017 | Sturtevant | G06Q 40/12 |
| | | | 717/102 |
| 2021/0263728 A1* | 8/2021 | Farrier | G06F 17/18 |
| 2023/0057691 A1* | 2/2023 | Sharma | G06F 11/0745 |

* cited by examiner

*Primary Examiner* — S. Sough
*Assistant Examiner* — Mohammad H Kabir
(74) *Attorney, Agent, or Firm* — Krishnendu Gupta; Lesley Leonessa

(57) ABSTRACT

Methods, system, and non-transitory processor-readable storage medium for bug fix system are provided herein. An example method includes executing at least one test on a system using an automated test tool. The bug fix system predicts at least one characteristic of a test related failure that occurred during the execution using test data produced by the automated test tool. The bug fix system predicts at least one source of the test related failure using the test data produced by the automated test tool.

20 Claims, 6 Drawing Sheets

AI BUG-FIX POSITIONING BY LSTM

FIELD

The field relates generally to analyzing test related failures, and more particularly to predicting the cause of test related failures in information processing systems.

BACKGROUND

Automated test tools produce many thousands of test result data points that contain critical information to identify the root cause of test related failures produced by the automated test tools. Efficient identification of the root cause of test related failures, therefore, is critical to the success of a software project.

SUMMARY

Illustrative embodiments provide techniques for implementing a bug fix system in a storage system. For example, illustrative embodiments execute at least one test on a system using an automated test tool. The bug fix system predicts at least one characteristic of a test related failure that occurred during the execution using test data produced by the automated test tool. The bug fix system predicts at least one source of the test related failure using the test data produced by the automated test tool. These and other illustrative embodiments include, without limitation, apparatus, systems, methods and processor-readable storage media.

DETAILED DESCRIPTION

Figure 1:
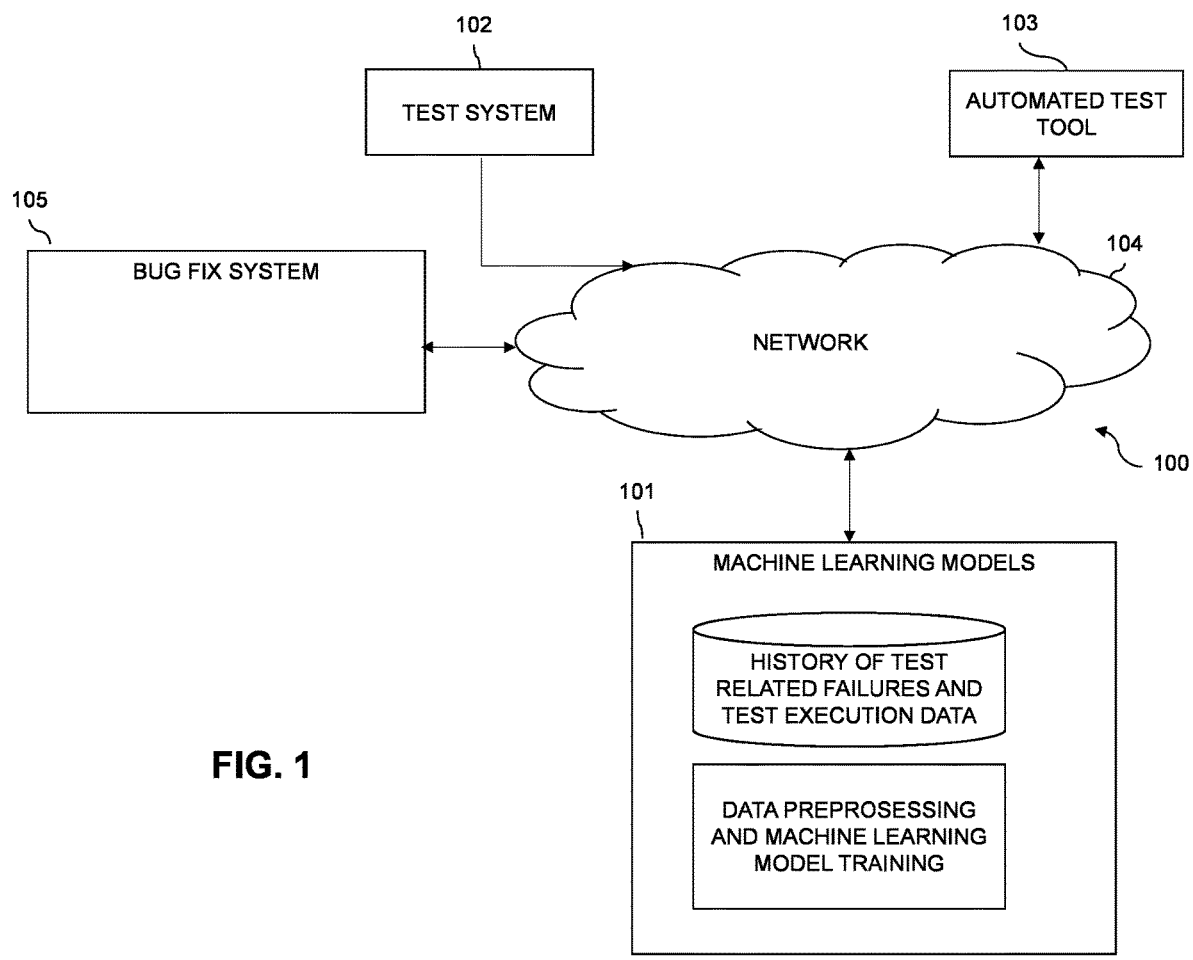
FIG. 1 shows an information processing system including a bug fix system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a bug fix system, which technique may be used to provide, among other things, identification of the cause of a test related failure by executing at least one test on a system using an automated test tool. The bug fix system predicts at least one characteristic of a test related failure that occurred during the execution using test data produced by the automated test tool. The bug fix system predicts at least one source of the test related failure using the test data produced by the automated test tool.

Conventional technologies for identifying root causes of test related failures rely on static review techniques of the test results. Conventional technologies that rely on static review techniques are time consuming, subjective and inefficient.

By contrast, in at least some implementations in accordance with the current technique as described herein, the source of test related failures is predicted by executing at least one test on a system using an automated test tool. The bug fix system predicts at least one characteristic of a test related failure that occurred during the execution using test data produced by the automated test tool. The bug fix system predicts at least one source of the test related failure using the test data produced by the automated test tool.

Thus, a goal of the current technique is to provide a method and a system for providing a bug fix system that can identify patterns and/or features hidden in test results that indicate the characteristics and root causes of test related failures. Another goal is to create a triage process to identify the root cause of test related failures. Another goal is to create machine learning systems that can predict the root causes of test related failures. Another goal is to train machine learning systems on the learned characteristics and root causes of test related failures. Another goal is to integrate the trained machine learning systems with the automated test tools to facilitate identification of the root cause of test related failures. Another goal is to improve the efficiency of positioning, tracking and resolving test related failures. Another goal is to reduce the workload of engineers manually performing this identification.

In at least some implementations in accordance with the current technique described herein, the use of a bug fix system can provide one or more of the following advantages: predicting the source of test related failures, and providing a bug fix system that is more efficient than human effort.

In contrast to conventional technologies, in at least some implementations in accordance with the current technique as described herein, identification and prediction of the source/cause of a test related failure is optimized by executing at least one test on a system using an automated test tool. The bug fix system predicts at least one characteristic of a test related failure that occurred during the execution using test data produced by the automated test tool. The bug fix system predicts at least one source of the test related failure using the test data produced by the automated test tool.

In an example embodiment of the current technique, a system environment machine learning system determines that the test related failure is not caused by an environmental factor, and the bug fix system provides the test related failure to a product/test machine learning system.

In an example embodiment of the current technique, a product/test machine learning system determines that the test related failure is caused by product code, and the bug fix system provides the test related failure to a remedy machine learning system.

In an example embodiment of the current technique, a remedy machine learning system determines that the test related failure should be fixed, and the bug fix system provides the test related failure to a source code machine learning system.

In an example embodiment of the current technique, the product/test machine learning system determines that the test related failure is caused by test code, and the bug fix system provides the test related failure to a test script machine learning system.

In an example embodiment of the current technique, a test script machine learning system predicts a location in a test script that caused the test related failure.

In an example embodiment of the current technique, a source code machine learning system predicts a location in source code that caused the test related failure.

In an example embodiment of the current technique, the system environment machine learning system is trained on the test data produced by the automated test tool to predict whether the test related failure is caused by an environmental factor or the system.

In an example embodiment of the current technique, the product/test machine learning system is trained on the test data produced by the automated test tool to predict whether the test related failure is caused by product code or test code.

In an example embodiment of the current technique, the remedy machine learning system is trained on the test data produced by the automated test tool to predict whether to remedy the test related failure.

In an example embodiment of the current technique, the test script machine learning system is trained on the test data produced by the automated test tool to predict a test script that caused the test related failure.

In an example embodiment of the current technique, the source code machine learning system is trained on the test data produced by the automated test tool to predict a location in the source code that caused the test related failure.

In an example embodiment of the current technique, at least one source of the test related failure is a location in source code that caused the test related failure.

In an example embodiment of the current technique, at least one source of the test related failure is a location in a test script that caused the test related failure.

In an example embodiment of the current technique, the predicting, by the bug fix system, at least one characteristic of the test related failure and the predicting, by the bug fix system, at least one source of the test related failure is performed by at least one long short-term memory neural network.

In an example embodiment of the current technique, the test data produced by the automated test tool comprises at least one of standard output, standard error, and stack trace.

FIG. 1 shows a computer network (also referred to herein as an information processing system) 100 configured in accordance with an illustrative embodiment. The computer network 100 comprises a bug fix system 105, at least one test system 102, at least one automated test tool 103, and machine learning models 101. The automated test tool 103 may be, for example Jira, Bugzilla, etc. The bug fix system 105, at least one test system 102, at least one automated test tool 103, and machine learning models 101 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. coupled to network 104 is the bug fix system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage. The machine learning models 101 are trained using a history of test related failures and test execution data. Pre-processing is performed on the history of test related failures and test execution data, and the machine learning models are trained with this data. In an example embodiment, regular expressions, for example, developed by test engineers are used to extract key information from the system output of the executed tests. The extracted information may then be used as input to at least one of the machine learning systems. Each of the bug fix system 105, at least one test system 102, at least one automated test tool 103, and machine learning models 101 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The bug fix system 105, at least one test system 102, at least one automated test tool 103, and machine learning models 101 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the bug fix system 105 are one or more input-output devices, which illustratively comprise keyboards, displays or other types of input-output devices in any combination. Such input-output devices can be used, for example, to support one or more user interfaces to the bug fix system 105, as well as to support communication between the bug fix system 105 and other related systems and devices not explicitly shown. For example, a dashboard may be provided for a user to view a progression of the execution of the bug fix system 105. One or more input-output devices may also be associated with one or more test systems 102.

Additionally, the bug fix system 105 in the FIG. 1 embodiment is assumed to be implemented using at least one processing device. Each such processing device generally comprises at least one processor and an associated memory, and implements one or more functional modules for controlling certain features of the bug fix system 105.

More particularly, the bug fix system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the bug fix system 105 to communicate over the network 104 with the bug fix system 105, at least one test system 102, at least one automated test tool 103, and machine learning models 101 and illustratively comprises one or more conventional transceivers.

A bug fix system 105 may be implemented at least in part in the form of software that is stored in memory and executed by a processor, and may reside in any processing device. The bug fix system 105 may be a standalone plugin that may be included within a processing device.

It is to be understood that the particular set of elements shown in FIG. 1 for bug fix system 105 involving the bug fix system 105, at least one test system 102, at least one automated test tool 103, and machine learning models 101 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the bug fix system 105 can be on and/or part of the same processing platform.

An exemplary process of bug fix system 105 in computer network 100 will be described in more detail with reference to, for example, the flow diagram of FIG. 4.

Figure 2:
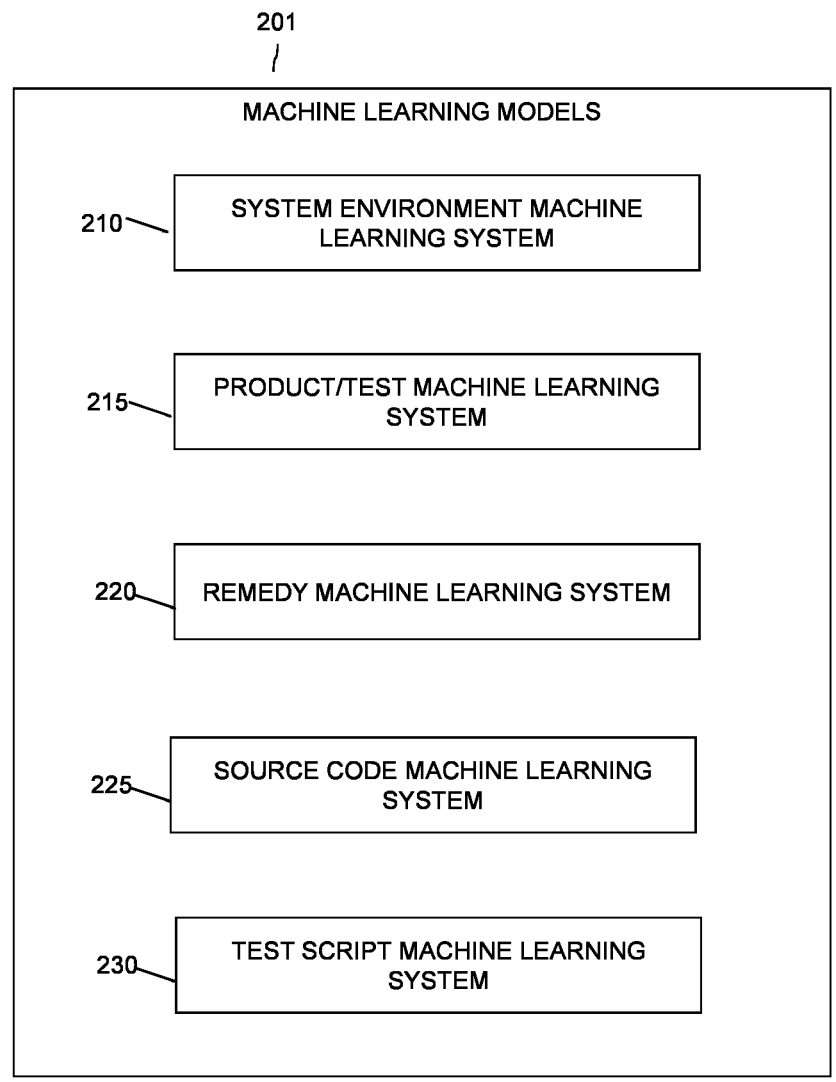
FIG. 2 shows an example of machine learning models in an illustrative embodiment.

Referring now to FIG. 2, this figure shows an example of machine learning models 201 in an illustrative embodiment. The machine learning models 101 are comprised of a system environment machine learning system 210, a product/test machine learning system 215, a remedy machine learning system 220, a source code machine learning system 225, and a test script machine learning system 230. In an example embodiment, the machine learning models 210 are integrated with at least one automated test tool 103 to facilitate a bug triage process which will be explained in more detail in FIG. 4.

In an example embodiment, the system environment machine learning system 210 is a binary classification model trained from historical test data in the automated test tool 103 to classify whether the test related failure is caused by environment factors, or by the test system 102.

In an example embodiment, the product/test machine learning system 215 is a binary classification model trained from historical test data in the automated test tool 103 to classify whether the test related failure is caused by the test tools or by the test system 102.

In an example embodiment, the remedy machine learning system 220 is a binary classification model trained from historical test data in the automated test tool 103 to classify whether the test related failure should be fixed immediately or whether the fix can be put on hold.

In an example embodiment, the source code machine learning system 225 is a multiclass classification model trained from historical test data in the automated test tool 103 to determine which source code file cause the test related failure.

In an example embodiment, the test script machine learning system 230 is a multiclass classification model trained from historical test data in the automated test tool 103 to determine which test script cause the test related failure.

Figure 3:
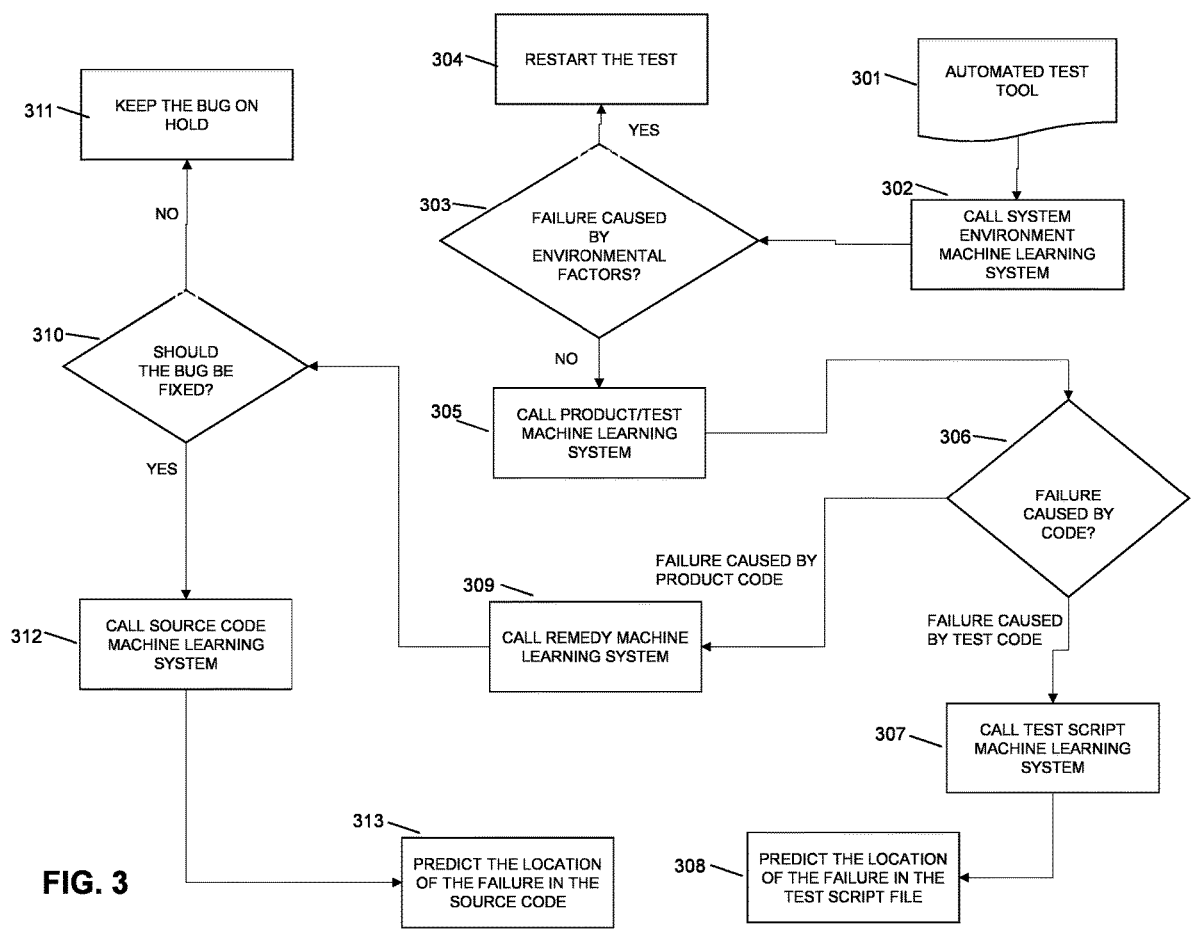
FIG. 3 shows a flow diagram of an example interaction among machine learning systems for a bug fix system in an illustrative embodiment.

Referring now to FIG. 3, this figure shows a flow diagram of an example interaction among machine learning systems for a bug fix system in an illustrative embodiment. In an example embodiment, at 301, output from the automated test tool 103 is used as input to the trained system environment machine learning system 210. At 302, the system environment machine learning system 210 classifies the test related failures into two categories; test related failures that are caused by environmental factors, and test related failures that are not. At 303, if the test related failures are caused by environmental factors, such as a lab issue, network disconnection, storage node powered off, etc., at 304, a decision is made to restart the test. If the test related failures are not caused by environmental factors, at 305, the bug fix system 105 calls the product/test machines learning system 215. At 306, the product/test machines learning system 215 classifies the test related failures as test related failures caused by test code, or test related failures caused by product code. If the product/test machines learning system 215 determines that the test related failures are caused by test code, at 307, the bug fix system 105 calls the test script machine learning system 230, and at 308, the test script machine learning system 230 predicts the location of the test related failures within the test script file. If the product/test machines learning system 215 determines that the test related failures are caused by product code, at 309, the bug fix system 105 calls the remedy machine learning system 220, and at 310, the remedy machine learning system 220 determine whether the test related failures should be fixed. If the remedy machine learning system 220 determines that the test related failures should not be fixed, or should not be fixed immediately, at 311, the bug fix system 105 keeps the test related failures on hold. If the remedy machine learning system 220 determines that the test related failures should be fixed, at 312, the bug fix system 105 calls the source code machine learning system 225. At 313, the source code machine learning system 225 predicts the location of the test related failures within the source code.

Figure 4:
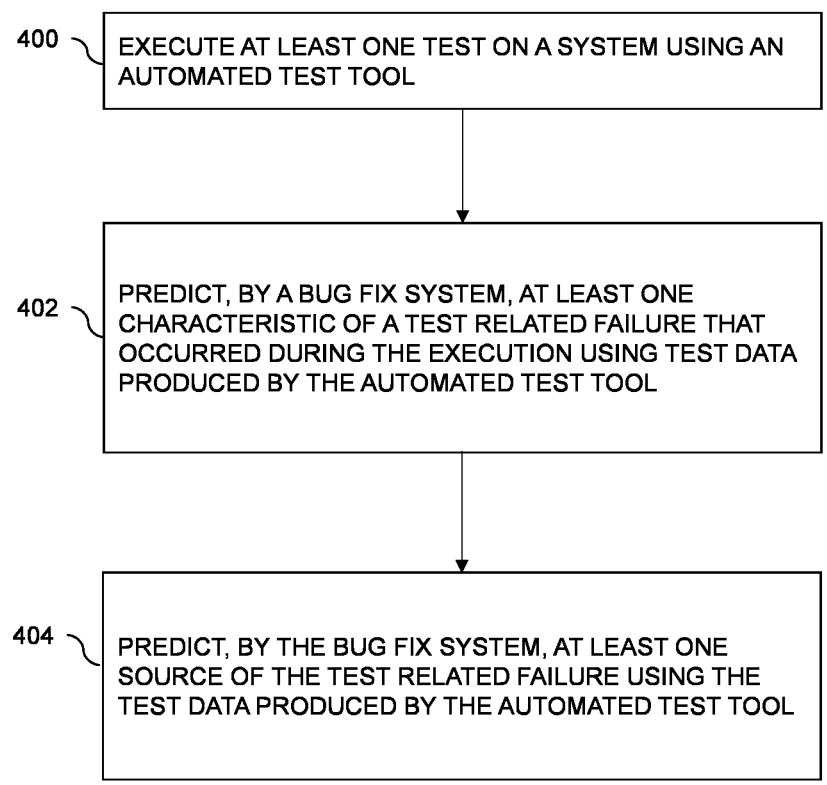
FIG. 4 shows a flow diagram of a process for a bug fix system in an illustrative embodiment.

FIG. 4 is a flow diagram of a process for execution of the bug fix system 205 in an illustrative embodiment. It is to be understood that this particular process is only an example, and additional or alternative processes can be carried out in other embodiments.

At 400, at least one test is executed on a test system 102 using an automated test tool 103. A test case may be executed on several different test system 102, and/or several test cases may be executed on a test system 102. The result of the execution of the test case may be test data produced by an automated test tool 103. The test data may comprise test related failures, for example, a bug with error information that was generated during the execution of the test case. In an example embodiment, the test data produced by the automated test tool 103 comprises at least one of standard output, standard error, and stack trace. In an example embodiment, the data logged by the automated test tool 103 may be comprised of two levels; a bug level and a test execution level. The test related failures are recorded in the automated test tool 103 and may have a bug description noted by an engineer and/or generated by the automated test tool 103, for example, extracted from running logs. In an example embodiment, for each test execution, standard output, standard error, and stack trace may be used to supplement the information in the test related failures.

In an example embodiment, the machine learning models 101 are trained to identify patterns and/or features in test results that indicate the characteristics and root causes of test related failures. In an example embodiment, machine learning models 101 are trained on historical data logged by at least one automated test tool 103. In an example embodiment, test data from multiple sources, for example, multiple test systems 102, is combined and linked together. For example, historical data is extracted using extraction, transformation and loading (ETL) tasks, and predictable labels are defined from business tags for machine learning model training. In other words, the historical data is extracted from at least one automated test tool 103. The bug features are joined, and business tags are mapped to the training data set labels. For example:

For bug characteristics, machine learning tasks are defined.

Bug type—The reported bug is caused by the test system 102 (Product Code) or the test scripts (Test Code). The bug of Feature Branch of the test system 102 is also categorized as Product Code.

Resolution—The reported bug should be fixed or ignored (i.e., not fixed). In an example embodiment, this is a subjective tag labeled by an engineer, and may be affected by some factors such as the bug priority, the release plan, recent workload, etc.

Lab Issue—The reported bug is caused by the environment factors (Lab Issue) such as: lab issue, network disconnection, storage node powered off or not (Non-Lab Issue). An example of mapping business tags to predictable labels for bug type analysis is shown below:

| Corresponding Triage Questions | Tag Category | Business Tag | Prediction Labels | |
|---|---|---|---|---|
| Bug Type–> Should the bug be fixed? | Bug Type | Test Code Product Code Feature Branch | Test Code Product Code | |
| Resolution–>Should the bug be fixed? | Resolution | Lab Issue | Non-Fixed | Lab Issue |
| Lab Issue–>Is the bug caused by environmental factors? | | No defect Cannot Reproduce Fixed | Fixed | Non-Lab Issue |

The original business tags provide a fine-grained classification of the reported bug. In an example embodiment, some tags are combined to simplify the machine learning tasks and confirm that the combination holds sufficient information to move forward to the next step.

In an example embodiment, using this information the machine learning models 101 are trained to get evaluation results. In an example embodiment, the evaluation results are obtained on a training set and a test set. The resulting bug type analysis prediction results of the machine learning models 101 are analyzed on the test set. In an example embodiment, a cut off point for practical use is determined based on each automated test tool 103 used.

In an example embodiment, if the resulting bug type analysis prediction determines that the cause of the test related failures is source code (or product code), the core dump files are parsed. In some examples, the bug features including the bug description, standard output, standard error, and stack trace may provide enough information to locate the root cause of the test related failures. In another example, debugger tools may be employed to analyze the core dump files to extract additional feature information. From this information, the machine learning models 101 are built to predict which source code file should be changed to fix the test related failures. For example, the information extracted from the core dump files is combined with the bug features to build the multi-label classifier mode to predict the possible source files that should be fixed. The optimized machine learning models 101 are then integrated with the test system 102 to predict the root cause of test related failures.

In an example embodiment, the bug fix system 105 performs a bug triage prediction process using the optimized machine learning models 101, for example, trained as described above. In the first stage of the bug triage prediction process, the bug fix system 105 performs a bug type analysis. In an example embodiment, the bug type analysis predicts at least one characteristic of the test related failures. In an example embodiment, there may be binary classifiers that determine triage questions for the test related failures. For example, is the test related failures caused by test scripts or source code, should the test related failures be fixed, and/or is the test related failures caused by dynamic environment factors.

In the second stage of the bug triage prediction process, the bug fix system 105 predicts the root cause of the test related failures, for example, locating the source of the test related failures in the test script and/or the source code. For example, if the first stage predicts that the root cause of the test related failures is product code, then the bug fix system 105 moves to the second stage, the root cause analysis stage, and uses one of the machine learning models, in this case, the source code machine learning system 225, to predict the source code file which should be modified to fix the test related failures (or "bug"). In an example embodiment, multi-label classifiers are built because the root cause of test related failures may be located in several related source code files. Thus, in an example embodiment, the bug fix system 105 may narrow down the root cause of the test related failures to several possible files (i.e., test scripts and/or source code files). In an example embodiment, the bug fix system 105 maps business tags and bug fix results to labels and builds supervised machine learning models to facilitate the bug triage prediction process.

At 402, the bug fix system 105 predicts at least one characteristic of a test related failure that occurred during the execution using test data produced by the automated test tool 103. In an example embodiment, a system environment machine learning system 210 determines that the test related failures are not caused by an environmental factor. In an example embodiment, the system environment machine learning system 210 is trained on the test data produced by the automated test tool 103 to predict whether the test related failure is caused by an environmental factor or the system. The bug fix system 105 then provides the test related failures to a product/test machines learning system 215. In an example embodiment, the product/test machines learning system 215 is trained on the test data produced by the automated test tool 103 to predict whether the test related failure is caused by product code or test code.

In an example embodiment, the product/test machines learning system 215 determines that the test related failure is caused by product code. The bug fix system 105 then provides the test related failure to a remedy machine learning system 220. In an example embodiment, the remedy machine learning system 220 is trained on the test data produced by the automated test tool 103 to predict whether to remedy the test related failure.

In an example embodiment, the product/test machines learning system 215 determines that the test related failure is caused by test code. The bug fix system 105 then provides the test related failure to a test script machine learning system 230. In an example embodiment, the test script machine learning system 230 is trained on the test data produced by the automated test tool 103 to predict a test script that caused the test related failure.

At 404, the bug fix system 105 predicts at least one source of the test related failure using the test data produced by the automated test tool 103. In an example embodiment, at least one source of the test related failure is a location in a test script that caused the test related failure. In an example embodiment, the test script machine learning system 230 predicts a location in a test script that caused the test related failure. In an example embodiment, at least one source of the test related failure is a location in source code that caused the test related failure. In an example embodiment, the source code machine learning system 225 predicts a location in source code that caused the test related failure. In an example embodiment, the source code machine learning system 225 is trained on the test data produced by the automated test tool 103 to predict a location in the source code that caused the test related failure.

In an example embodiment, predicting, by the bug fix system, at least one characteristic of the test related failure and predicting, by the bug fix system, at least one source of the test related failure is performed by at least one long short-term memory (LSTM) neural network. LSTM networks are well-suited to classifying, processing and making predictions based on time series data, since there can be lags of unknown duration between important events in a time series.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve identification of the root cause of test related failures. These and other embodiments can effectively improve test related failure identification relative to conventional approaches. For example, embodiments disclosed herein provide a bug fix system that can identify patterns and/or features hidden in test results that indicate the characteristics and root causes of test related failures. Embodiments disclosed herein create a triage process to identify the root cause of test related failures. Embodiments disclosed herein create machine learning systems that can predict the root causes of test related failures. Embodiments disclosed herein train machine learning systems on the learned characteristics and root causes of test related failures. Embodiments disclosed herein integrate the trained machine learning systems with the automated test tools to facilitate identification of the root cause of test related failures. Embodiments disclosed herein improve the efficiency of positioning, tracking and resolving test related failures. Embodiments disclosed herein reduce the workload of engineers manually performing this identification. Embodiments disclosed herein provide a bug fix system that is easily scaled with regard to test systems and automated test tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of the information processing system 100, these platforms may also be used to implement at least portions of other information processing systems in other embodiments.

Figure 5:
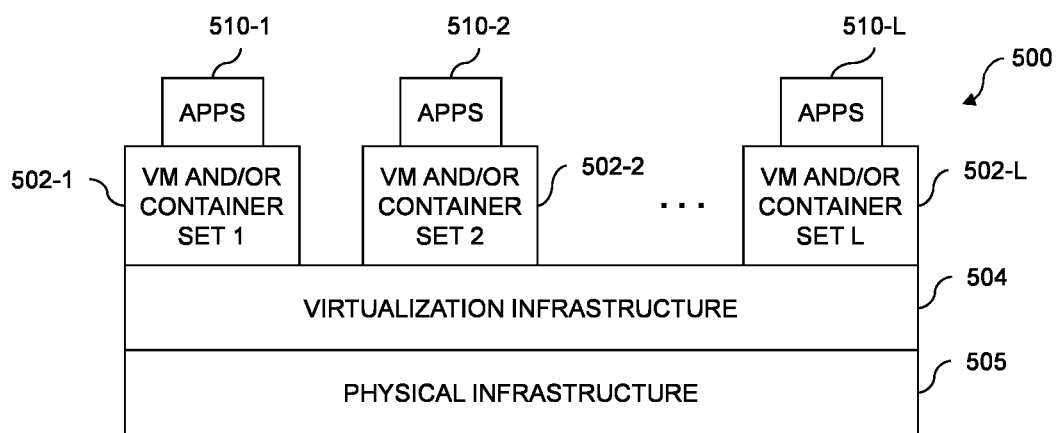
FIGS. 5 and 6 show examples of processing platforms that may be utilized to implement at least a portion of a bug fix system embodiments.
Figure 6:
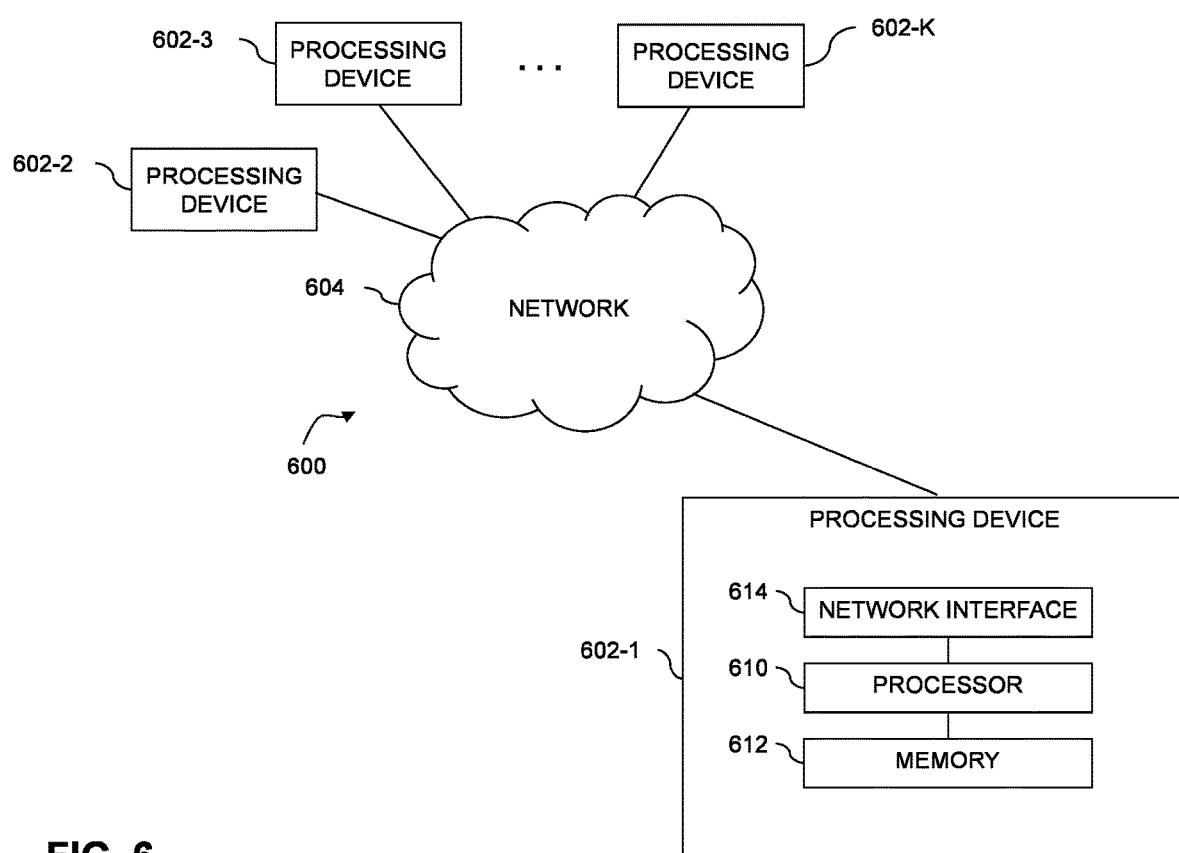

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, where the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of the information processing system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   executing at least one test on a system using an automated test tool;
   receiving, by a system environment machine learning system, from the automated test tool, a result associated with the executing the at least one test;
   in response to the receiving, invoking, by a bug fix system, a product or test machine learning system, wherein the product or test machine learning system classifies the result;
   in response to the classification, invoking, by the bug fix system, at least one of a test script machine learning system and a remedy machine learning system;
   in response to the invoking the at least one of the test script machine learning system and the remedy machine learning system, predicting, by the bug fix system, at least one characteristic of a test related failure that occurred during the execution using test data produced by the automated test tool; and
   predicting, by the bug fix system, at least one source of the test related failure using the test data produced by the automated test tool, wherein the method is performed by at least one processing device comprising a processor coupled to a memory.

2. The method of claim 1 wherein the predicting, by the bug fix system, the at least one characteristic of the test related failure comprises:
   determining, by the system environment machine learning system, that the test related failure is not caused by an environmental factor; and
   providing, by the bug fix system, the test related failure to the product/test product or test machine learning system.

3. The method of claim 1 wherein the predicting, by the bug fix system, the at least one characteristic of the test related failure comprises:
   determining, by the product or test machine learning system, that the test related failure is caused by product code; and
   providing, by the bug fix system, the test related failure to the remedy machine learning system.

4. The method of claim 1 wherein the predicting, by the bug fix system, the at least one characteristic of the test related failure comprises:
   determining, by the remedy machine learning system, that the test related failure should be fixed; and
   providing, by the bug fix system, the test related failure to a source code machine learning system.

5. The method of claim 1 wherein the predicting, by the bug fix system, the at least one characteristic of the test related failure comprises:
   determining, by the product or test machine learning system, that the test related failure is caused by test code; and
   providing, by the bug fix system, the test related failure to the test script machine learning system.

6. The method of claim 1 wherein the predicting, by the bug fix system, the at least one source of the test related failure comprises:
   predicting, by the test script machine learning system, a location in a test script that caused the test related failure.

7. The method of claim 1 wherein the predicting, by the bug fix system, the at least one source of the test related failure comprises:
   predicting, by a source code machine learning system, a location in a source code that caused the test related failure.

8. The method of claim 1 wherein the system environment machine learning system is trained on the test data produced by the automated test tool to predict whether the test related failure is caused by an environmental factor or the system.

9. The method of claim 1 wherein the product or test machine learning system is trained on the test data produced by the automated test tool to predict whether the test related failure is caused by product code or test code.

10. The method of claim 1 wherein the remedy machine learning system is trained on the test data produced by the automated test tool to predict whether to remedy the test related failure.

11. The method of claim 1 wherein the test script machine learning system is trained on the test data produced by the automated test tool to predict a test script that caused the test related failure.

12. The method of claim 1 wherein a source code machine learning system is trained on the test data produced by the automated test tool to predict a location in a source code that caused the test related failure.

13. The method of claim 1 wherein the at least one source of the test related failure is a location in source code that caused the test related failure.

14. The method of claim 1 wherein the at least one source of the test related failure is a location in a test script that caused the test related failure.

15. The method of claim 1 wherein the predicting, by the bug fix system, the at least one characteristic of the test related failure and the predicting, by the bug fix system, the at least one source of the test related failure is performed by at least one long short-term memory neural network.

16. The method of claim 1 wherein the test data produced by the automated test tool comprises at least one of standard output, standard error, and stack trace.

17. A system comprising:
   at least one processing device comprising a processor coupled to a memory;
   the at least one processing device being configured:
      to execute at least one test on a system using an automated test tool;

to receive, by a system environment machine learning system, from the automated test tool, a result associated with the executing the at least one test;
in response to the receiving, to invoke, by a bug fix system, a product or test machine learning system, wherein the product or test machine learning system classifies the result;
in response to the classification, to invoke, by the bug fix system, at least one of a test script machine learning system and a remedy machine learning system;
in response to the invoking the at least one of the test script machine learning system and the remedy machine learning system, to predict, by the bug fix system, at least one characteristic of a test related failure that occurred during the execution using test data produced by the automated test tool; and
to predict, by the bug fix system, at least one source of the test related failure using the test data produced by the automated test tool.

18. The system of claim 17 wherein the predicting, by the bug fix system, the at least one characteristic of the test related failure and the predicting, by the bug fix system, the at least one source of the test related failure is performed by at least one long short-term memory neural network.

19. The system of claim 17 wherein the system configured to predict, by the bug fix system, the at least one characteristic of the test related failure is further configured to:
determine, by the product or test machine learning system, that the test related failure is caused by product code;
provide, by the bug fix system, the test related failure to the remedy machine learning system;
determine, by the remedy machine learning system, that the test related failure should be fixed;
provide, by the bug fix system, the test related failure to a source code machine learning system; and
wherein the system configured to predict, by the bug fix system, the at least one source of the test related failure is further configured to:
predict, by the source code machine learning system, a location in source code that caused the test related failure.

20. A computer program product comprising a non-transitory processor-readable storage medium having stored therein program code of one or more software programs, wherein the program code when executed by at least one processing device causes said at least one processing device:
to execute at least one test on a system using an automated test tool;
to receive, by a system environment machine learning system, from the automated test tool, a result associated with the executing the at least one test;
in response to the receiving, to invoke, by a bug fix system, a product or test machine learning system, wherein the product or test machine learning system classifies the result;
in response to the classification, to invoke, by the bug fix system, at least one of a test script machine learning system and a remedy machine learning system;
in response to the invoking the at least one of the test script machine learning system and the remedy machine learning system, to predict, by the bug fix system, at least one characteristic of a test related failure that occurred during the execution using test data produced by the automated test tool; and
to predict, by the bug fix system, at least one source of the test related failure using the test data produced by the automated test tool.

\* \* \* \* \*